United States Patent [19]
Ericsson

[11] Patent Number: 6,130,665
[45] Date of Patent: Oct. 10, 2000

[54] TOUCH SCREEN HANDLING

[75] Inventor: Ted Ericsson, Lomma, Sweden

[73] Assignee: Telefonaktiebolaget LM Ericsson, Stockholm, Sweden

[21] Appl. No.: 09/053,083

[22] Filed: Apr. 1, 1998

[51] Int. Cl.[7] .................................................. G06F 7/00
[52] U.S. Cl. ........................ 345/173; 345/174; 345/178; 178/18.01; 178/18.02; 178/18.05; 178/18.06
[58] Field of Search ..................................... 345/173, 174, 345/178; 178/18.01, 18.02, 18.05, 18.06

[56] References Cited

U.S. PATENT DOCUMENTS

| | | |
|---|---|---|
| 4,603,330 | 7/1986 | Horne et al. . |
| 4,875,036 | 10/1989 | Washizuka et al. ..................... 345/173 |
| 4,896,223 | 1/1990 | Todome ................................. 345/173 |
| 5,430,436 | 7/1995 | Fennell .................................. 345/173 |
| 5,457,454 | 10/1995 | Sugano . |
| 5,559,301 | 9/1996 | Bryan, Jr. et al. ....................... 345/173 |
| 5,581,243 | 12/1996 | Ouellette et al. ....................... 345/173 |
| 5,638,501 | 6/1997 | Gough et al. ........................... 395/135 |
| 5,661,476 | 8/1997 | Wang et al. ............................ 345/173 |
| 5,838,302 | 11/1998 | Kuriyama et al. ...................... 345/173 |

FOREIGN PATENT DOCUMENTS

| | | |
|---|---|---|
| 0 679 985 | 11/1995 | European Pat. Off. . |
| 2 632 745 | 12/1989 | France . |
| 5-257439 | 10/1983 | Japan . |
| 6-337660 | 12/1994 | Japan . |
| 7-13548 | 1/1995 | Japan . |
| 7-104668 | 4/1995 | Japan . |
| 98/09270 | 3/1998 | WIPO . |

OTHER PUBLICATIONS

"Cursor–Tracking Highlighter", IBM Technical Disclosure Bulletin, vol. 39, No. 10, 1Oct. 1996, pp. 211–213, XP000631385.

"Semi–Transparent Cursor", IBM Technical Disclosure Bulletin, vol. 38, No. 10, 1 Oct. 1995, pp. 271–272, XP000540489.

*Primary Examiner*—Bipin Shalwala
*Assistant Examiner*—Vincent E. Kovalick
*Attorney, Agent, or Firm*—Burns, Doane, Swecker & Mathis, L.L.P.

[57] ABSTRACT

The present invention discloses a data input device including a touch screen. The touch screen has two information display levels. A first level displays a virtual alphanumeric keypad which allows a user to input textual data by simply touching the screen. The second level displays the input textual data. The touch screen allows for simultaneous display of both the virtual keypad and the input data by representing the virtual keypad and underlying textual data by different colors, character sizes, styles, fonts, intensities, etc.

22 Claims, 4 Drawing Sheets

The virtual keypad and the entered information are displayed on the same parts of the screen but in different fashions, e.g. text and virtual keypad are overlaid using different colours, character sizes, styles, fonts, strengths, intensities, etc.

EX 1 2 3 4 5 6 7 8 9 0 - = ↓

The parameters controlling the nature of the keypad and the information pictures, could other be freely adjustable by the user. P [ ] + \

The user would learn to instantly switch between focusing his/her attention on the keypad TAB A S D displayed information CR In addition, Z (touch) key would allow the user to switch between different parameters of one or both (all) the overlaid pictures, e.g. in order to make the pictures more or less "dominating". DEL

CTRL ALT ● ■ ▲ ▶ ▼

Another possibility is to have a thin part that can be positioned on top of the touch screen. This part would show a picture of the keypad while transparent enough for the user to read the information shown on the screen underneath it. It would also be "soft" not to "attenuate" the touches by the user.

FIG. 4

TOUCH SCREEN HANDLING

BACKGROUND

The present invention is directed towards an electronic input/display system, and more particularly towards those electronic input/display systems including touch sensitive screens which allow for the manual input of data via the system's display device.

Recently, computer systems have become more compact, smaller in size, and lighter in weight. More and more functions are being integrated into smaller and smaller devices, due to the advent of smaller and more powerful microprocessors. For example, today it is quite common to find personal organizers which include editors, spreadsheets, or cellular phone capabilities.

Most portable devices on the market to-date are foldable with separate keyboards and displays. The keyboards are normally on one half of the unit (i.e., the base) and the display on the other (i.e., the lid). Attempts have been made to reduce the overall size of these units. Some manufacturers have reduced the size of portable devices by reducing the size of the unit's keyboard. Typically in those systems, the same physical key corresponds to multiple letters, e.g., A, B, and C. The letters are either toggled with each key stroke, e.g., requiring 3 key strokes for the letter C, or the unit uses a dictionary to guess the words when the space bar is pressed, showing alternatives when more than one word meets the sequence of key strokes.

Units also exist without a separate keyboard, instead being equipped with a touch screen that both displays, and allows the user to enter, information. A virtual keypad displayed on the screen is often the input mechanism for these units. The user can press a virtual key either using his/her finger tops or some special pointing device, e.g., a stylus. The touch is sensed by the unit, and the selected character is a result of the location of the touch. U.S. Pat. No. 5,457,454 to Sugano discloses such a unit wherein keys are selected by means of a write-pen. Such a system limits the speed at which data can be input.

Moreover, in portable devices with smaller display screens, a virtual alphanumeric keypad tends to cover most of the screen allowing little, if any, information to be shown simultaneously with data input. This makes tasks, such as text editing, difficult, since most users like to frequently and instantly review what they have typed.

Therefore, a need exists for small portable devices that can simultaneously present large amounts of information and allow quick and easy entering of information using a touch sensitive display.

SUMMARY

The present invention overcomes the foregoing deficiencies by providing a display screen which allows for the simultaneous input and display of textual information.

In a first embodiment of the present invention, a data input device is provided which includes a touch screen. The touch screen has two information display levels. A first level displays a virtual alphanumeric keypad which allows a user to input textual data by simply touching the screen. The second level displays the resulting input textual data. The touch screen allows for simultaneous display of both the virtual keypad and the input data by representing the virtual keypad and underlying data by different colors, character sizes, styles, fonts, intensities, etc.

In a second embodiment, a thin overlay, which displays a picture keypad, is positioned on top of the touch screen as an alternative to the virtual keypad display. The overlay is transparent enough to enable a user to see the screen beneath it. When the underlying text is presented with an attribute different than that of the thin keypad overlay, a user is able to simultaneously see and clearly distinguish between the transparent overlay and the underlying text.

BRIEF DESCRIPTION OF THE DRAWINGS

The above objects and features of the present invention will be more apparent from the following description of the preferred embodiments with reference to the accompanying drawings, wherein:

FIG. 4 illustrates the display screen including both the virtual keypad and the underlying textual data according to one exemplary embodiment of the present invention.

DETAILED DESCRIPTION

Figure 1:
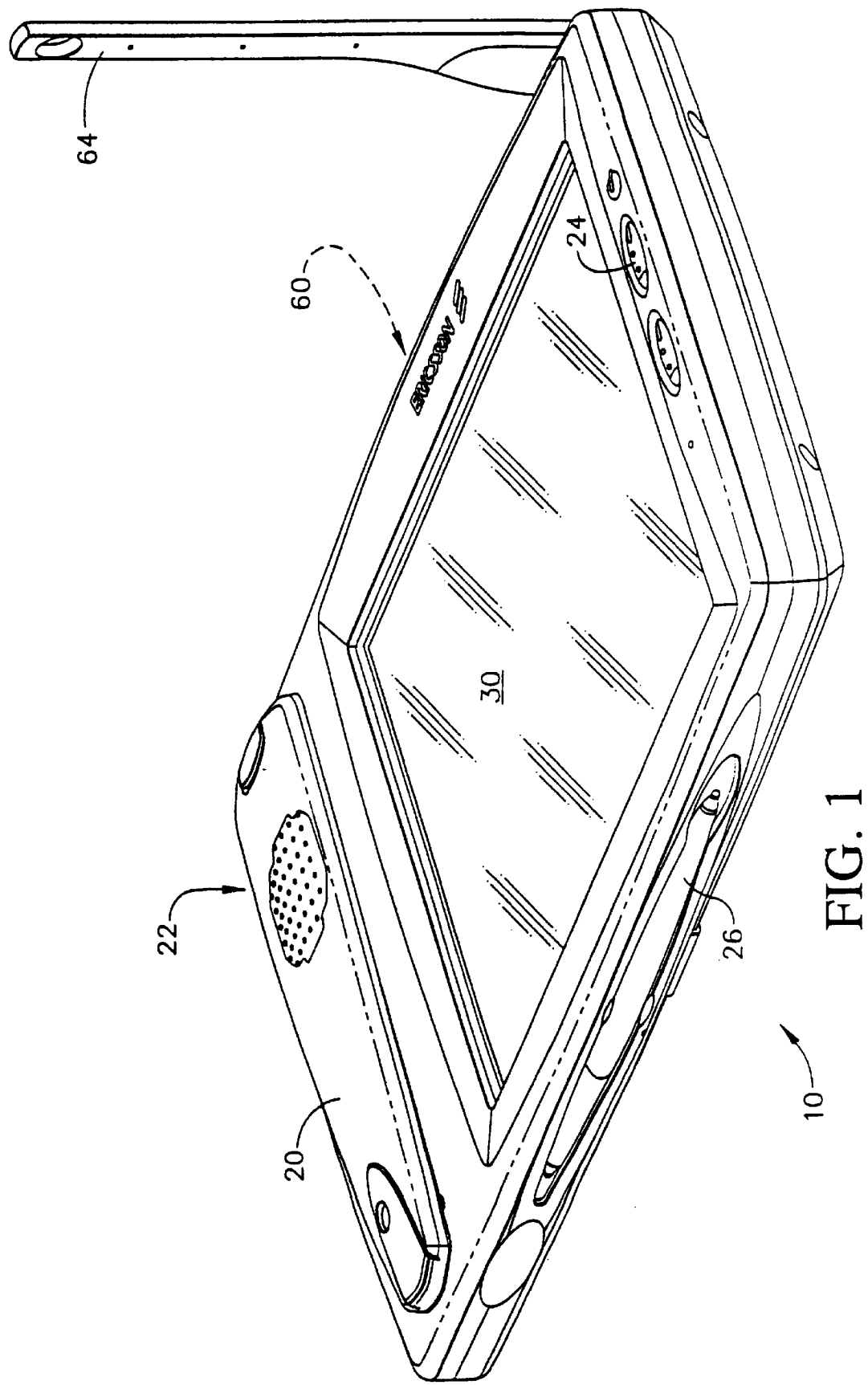
FIG. 1 illustrates a frontal view of an exemplary portable device within which techniques according to the present invention can be implemented.

FIG. 1 provides a portable device 10 within which the techniques according to the present invention can be implemented. Among the major components of the portable device 10 are a telephone handset 20, a speaker 22, control buttons 24, a stylus 26, and a touch screen display 30. An antenna 64 and various optional plug-in ports 60 (not shown), such as personal computer card ports and a telephone land-line connector, are also included. This portable device 10 can, for example, be no larger than a standard business desk telephone. The touch screen display 30 is rectangular and has a pixel density of, for example, 640 by 480 pixels and is no greater than 8 inches measured diagonally. This is smaller than a portable computer screen which typically is at least 10 to 12 inches measured diagonally.

Figure 2:
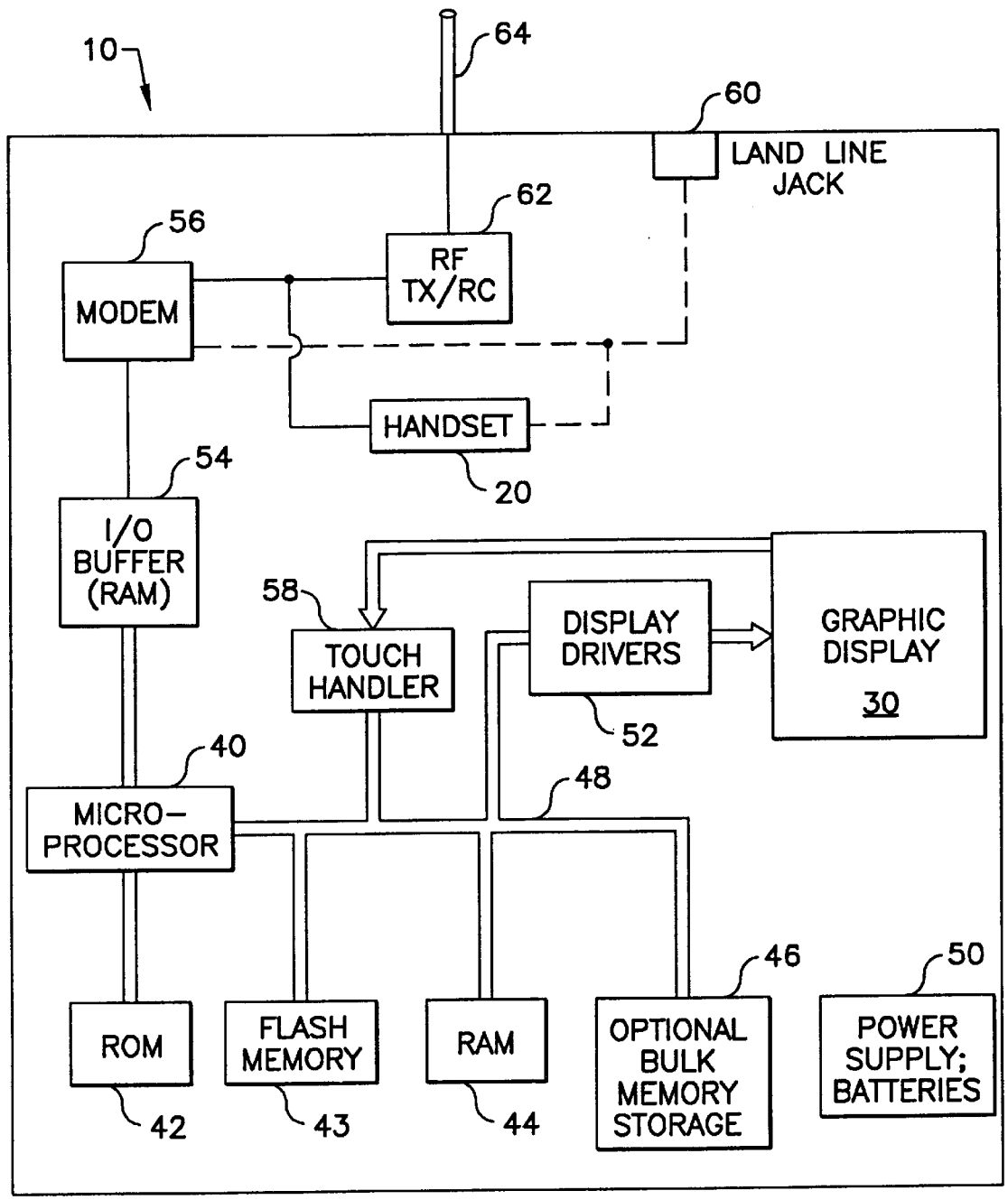
FIG. 2 illustrates the functional components of the portable device of FIG. 1.

The major components of the portable device 10 are provided in block diagram format in FIG. 2. A microprocessor 40 controls the various operations associated with transferring data into and out of the portable device, and controls the graphic display 30. Microprocessor 40 communicates with other components of portable device 10 over a bus 48 that includes address lines, data lines and control lines. Bus 48 connects microprocessor 40 to a ROM 42, user changeable non-volatile "flash" memory (e.g. an EPROM) 43, RAM 44 and an optional memory storage device 46, such as a hard disk drive. The power for portable device 10 is supplied by batteries 50. Microprocessor 40 is connected to a display drive circuit 52. The display drive circuit 52 controls the images that are emitted by the touch screen display 30.

The touch screen display 30 includes touch sensors (not shown) which sense the touch of a user and signals the location of the touch to a touch handler 58. The touch handler 58 determines what the touch represents. As set forth in the present invention, the touch could, for example, represent a keystroke on a virtual keypad. The touch handler 58 communicates with the microprocessor 40 via bus 48.

Microprocessor 40 communicates with a set of input/output buffers 54. Input/output buffers 54 may be provided as a separate memory or may be part of the RAM 44. The input/output buffers 54 are connected to a modem 56, which in turn is connected to the handset 20. Modem 56 is also optionally connected to a land-line connection (e.g. via land-line jack 60), which enables the portable device 10 to directly plug into a telephone line via a wall jack. Modem 56 is also connected via a matrix switch (not shown) to a radio frequency transmitter/receiver unit 62, which in turn is connected to antenna 64.

The portable device 10 can be configured to act as a very powerful and versatile piece of communications equipment, and with the proper software, it can also act as a portable computer having a flat panel display. However, since the graphic display 30 is smaller than that provided with a typical computer monitor screen, there is insufficient space on the display to provide a full virtual alphanumeric keypad on one part of the screen while simultaneously displaying the input textual results on another separate part of the screen. The instant invention overcomes this deficiency.

In a first embodiment of the present invention, the portable device generates a virtual keypad on display 30 which allows a user to manually enter information for purposes such as word processing. Virtual keypads are well known in the art and the generation of such is well within the skill of those skilled in the art using standard programming techniques.

Figure 3:
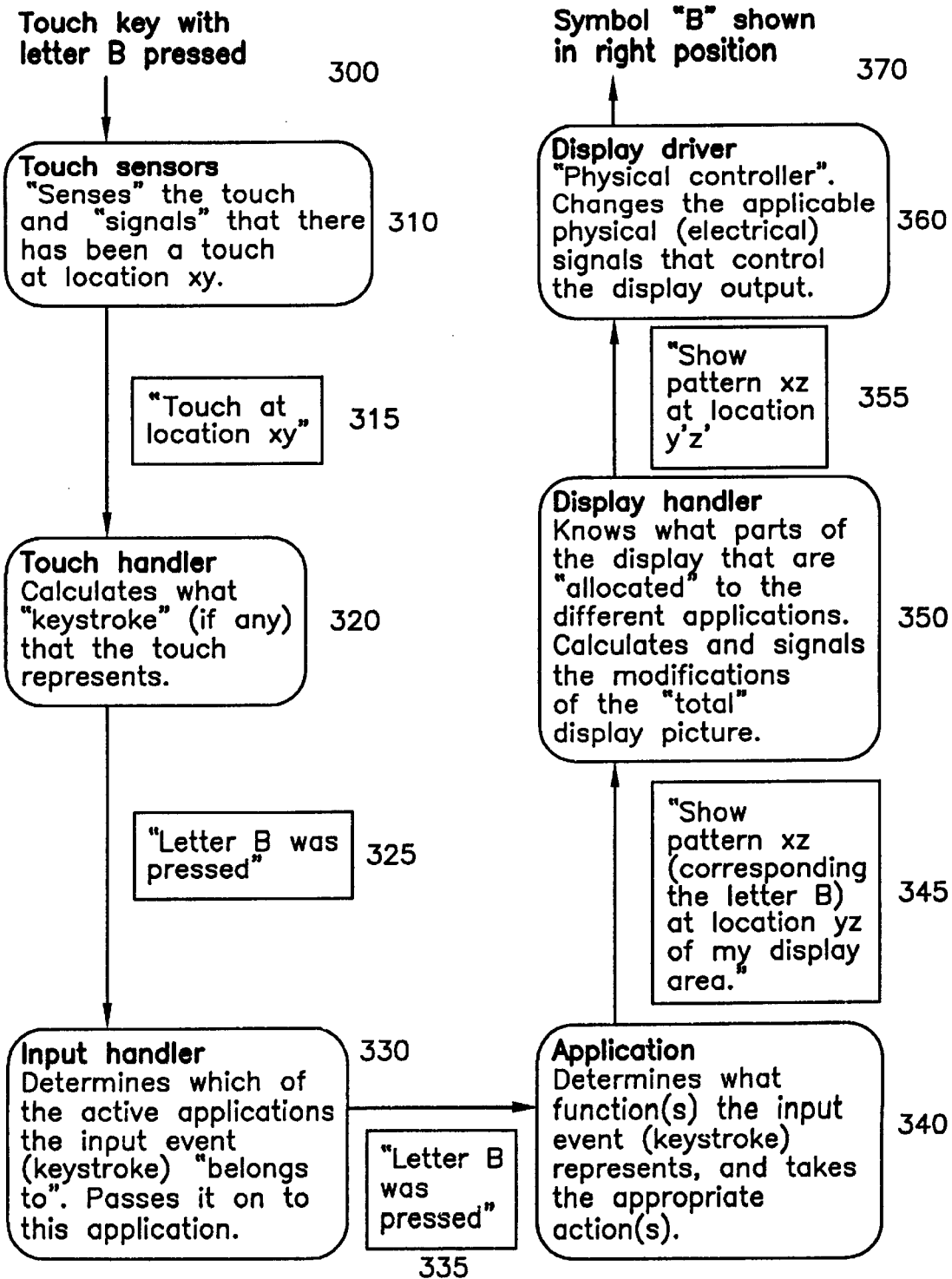
FIG. 3 illustrates a functional block diagram of an exemplary method by which a user inputs information through the use of a virtual keypad according to the present invention.

FIG. 3 illustrates an exemplary technique by which information is input and displayed through the use of the virtual keypad of the present invention. In FIG. 3, the user touches a letter of the keypad, such as the letter B, step 300. Touch sensors, within portable device 10, sense that a touch has occurred and signal the location xy to a touch handler, steps 310 and 315. In step 320, the touch handler determines what "keystroke," if any, the touch represents. In this example, the touch handler would indicate that the letter B has been pressed. This information is then transferred to an input handler, step 325. The input handler determines to which of the active applications, running on portable device 10, the keystroke belongs, step 330. The input handler will then transfer the information (i.e., that the letter B was pressed) to the intended application, step 335. In step 340, the application will subsequently determine what function(s) the keystroke represents and take the appropriate action(s). In the present example, the application will determine that pattern xz, which corresponds to the letter B, should be displayed at location yz of the display area. This determination is then transferred to a display handler, step 345. The display handler monitors which parts of the display are allocated to the different applications. The display handler calculates the modifications to be made to the total display picture and generates a signal indicative thereof, step 350. This signal is sent to the display driver for processing, step 355. In step 360, the display driver changes the applicable physical (electrical) signals that control the display output. Finally in step 370, the symbol "B" will be displayed in the corresponding position (i.e., location yz) on the display screen.

FIG. 4 illustrates the display screen 30, according to one exemplary embodiment of the present invention, where the virtual keypad and the entered information are simultaneously provided on two separate display levels. As is evident from FIG. 4, the virtual keypad and the entered information are displayed on the same parts of the screen but in different fashions (i.e., the entered information is displayed in a regular font style while the overlaid keypad is displayed in a bold font style), By displaying the keypad and entered information in different fashions, a user can easily learn to change his/her focus from the keypad to the entered information or vice versa.

While the display in FIG. 4 shows the keypad and underlying textual information in regular and bold font styles, it is clear that other font styles or display attributes could be used. For example, the virtual keypad could be overlaid on the entered information using different colors, character sizes, styles, fonts, display intensities, etc.

The keys of the virtual keypad, set forth in FIG. 4, are provided for illustrative purposes only. One skilled in the art would clearly recognize that other keys could also be provided on the virtual keypad in order to increase the functionality of the keypad. For example, the virtual keypad could be provided with a function key (or "touch key") which would allow the user to switch or modify the parameters used to display the keypad and underlying information. It is evident that the touch key could alternatively be implemented as a physical key located on the portable device 10. Irrespective of the implementation method, the touch key would enable the user to make the keypad appear more or less dominating in relation to the underlying text. For example, in the display of FIG. 4, the touch key could enable the user to switch font styles thereby making the underlying text bold while the keypad is a regular font style. The touch key could also be used to swap display levels. That is, the depressing of the touch key would result in the entered information overlaying the virtual keypad.

Similarly, function keys could be provided to, among other things, allow the keypad or underlying text to be switched to an alternative attribute(s). Individual function keys could be set to provide a predetermined attribute or permit the user to select from a plurality of attributes via, for example, a pop-up menu. As a result, the user could easily customize the appearance of the display.

The virtual keypad of the present invention is clearly not limited to word processing applications. The keypad could just as easily be implemented in any computer processing environment where data input is required, such as spreadsheet applications, calender applications, etc.

In the second embodiment of the present invention, a thin overlay is positioned on top of the touch screen as an alternative to the display of the virtual keypad on the screen. The thin overlay would show a picture keypad which would be transparent enough for the user to read the information shown on the screen underneath it. The keypad overlay should also be sufficiently deformable so as not to attenuate the touches by the user so much that the touch sensitive screen fails to register the user's input. This keypad would function in a manner similar to the virtual keypad discussed above, i.e., the appearance attributes of the underlying, manually entered information will be different from that used to form the symbols on the overlay.

The present invention has been described in terms of specific embodiments to facilitate understanding. The above embodiments, however, are illustrative rather than restrictive. It will be readily apparent to one skilled in the art that departures may be made from the specific embodiments shown above without departing from the central spirit and scope of the invention. Therefore, the invention should not be regarded as being limited to the above examples, but should be regarded instead as being fully commensurate in scope with the following claims.

What is claimed is:

1. A data input and display device comprising:

a screen which allows for the input and output of information;

the screen comprising two levels:

a first level displaying a virtual alphanumeric keypad for allowing a user to input information; and a second level for displaying the information associated with the user input;

wherein the user-input information and the virtual keypad are simultaneously displayed using different colors, character sizes, styles, fonts, or display intensities which allows the user to distinguish between the display levels; and a touch key for allowing a user to swap display levels.

2. The data input and display device according to claim 1 wherein the touch key is a physical key located on the data input and display device.

3. The data input and display device according to claim 1 wherein the touch key is a virtual key displayed on the screen.

4. A data input and display device comprising:

a screen which allows for the input and output of information;

the screen comprising two levels:

a first level displaying a virtual alphanumeric keypad for allowing a user to input information; and a second level for displaying the information associated with the user input;

wherein the user-input information and the virtual keypad are displayed using different attributes; and a touch key for allowing a user swap display levels.

5. The data input and display device according to claim 4 wherein the different attributes are different colors.

6. The data input and display device according to claim 4 wherein the different attributes are different character sizes.

7. The data input and display device according to claim 4 wherein the different attributes are different character styles.

8. The data input and display device according to claim 4 wherein the different attributes are different character fonts.

9. The data input and display device according to claim 4 wherein the different attributes are different display intensities.

10. The data input and display device according to claim 4 wherein the touch key allows for a user to switch between different display attributes.

11. The data input and display device according to claim 10 wherein the touch key is a physical key located on the data input and display device.

12. The data input and display device according to claim 10 wherein the touch key is a virtual key displayed on the screen.

13. A data input device comprising:

a touch screen which allows for the input and output of information;

a physical alphanumeric keypad overlay;

wherein
the alphanumeric keypad overlay is positioned over the touch screen for allowing a user to input information, and the alphanumeric keypad overlay is transparent to allow said input information to be seen.

14. The data input device according to claim 13 wherein the user input information and alphanumeric keypad are provided using different display attributes.

15. The data input device of claim 13, wherein said physical overlay is made from deformable material.

16. A method for inputting and displaying information on a touch screen comprising the steps of:

displaying at a first level a virtual alphanumeric keypad for allowing a user to input information;

displaying at a second level said input information;

wherein the first and second levels are displayed using different attributes; and providing a touch key for allowing a user to swap display levels.

17. The method for inputting and displaying information according to claim 16 wherein the different attributes are different colors.

18. The method for inputting and displaying information according to claim 16 wherein the different attributes are different character sizes.

19. The method for inputting and displaying information according to claim 16 wherein the different attributes are different character styles.

20. The method for inputting and displaying information according to claim 16 wherein the different attributes are different character fonts.

21. The method for inputting and displaying information according to claim 16 wherein the different attributes are different display intensities.

22. The method for inputting and displaying information according to claim 16 wherein the step of providing a touch key also allows a user to switch between different display attributes.

* * * * *